US009611824B2

(12) United States Patent
Gami

(10) Patent No.: US 9,611,824 B2
(45) Date of Patent: Apr. 4, 2017

(54) PROCESS FOR MANUFACTURING AN INJECTOR BODY

(71) Applicant: Caterpillar Inc., Peoria, IL (US)

(72) Inventor: Rahul N. Gami, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/624,651

(22) Filed: Feb. 18, 2015

(65) Prior Publication Data

US 2016/0237970 A1 Aug. 18, 2016

(51) Int. Cl.

| | |
|---|---|
| ***F02M 61/18*** | (2006.01) |
| ***B23H 9/00*** | (2006.01) |
| ***B23K 26/382*** | (2014.01) |
| ***F02M 61/16*** | (2006.01) |

(52) U.S. Cl.

CPC .......... *F02M 61/168* (2013.01); *F02M 61/18* (2013.01); *F02M 61/1846* (2013.01); *F02M 2200/8069* (2013.01)

(58) Field of Classification Search

CPC .......... B23H 9/006; B23H 9/14; B23K 26/38; B23K 26/389; B23K 26/382; F02M 61/168; F02M 61/18

USPC ........... 29/890.12, 890.13, 890.132, 890.142

See application file for complete search history.

(56) References Cited

U.S. PATENT DOCUMENTS

| | | | | | |
|---|---|---|---|---|---|
| 4,639,568 | A * | 1/1987 | Check | B23H 9/10 | 219/69.11 |
| 4,819,871 | A * | 4/1989 | Kronberger | F02M 61/166 | 29/890.142 |
| 4,857,696 | A * | 8/1989 | Taeusch | B23H 5/00 | 219/121.7 |
| 5,166,493 | A * | 11/1992 | Inagawa | B23K 26/0604 | 219/121.69 |
| 5,351,398 | A * | 10/1994 | Haxell | F02M 61/166 | 239/533.2 |
| 5,371,338 | A | 12/1994 | Proto et al. | | |
| 5,401,932 | A * | 3/1995 | Hashimoto | B23H 9/00 | 216/12 |
| 6,070,813 | A | 6/2000 | Durheim | | |
| 6,914,214 | B2 * | 7/2005 | Byrd | F01D 5/186 | 219/121.71 |
| 8,624,151 | B2 | 1/2014 | Elfizy et al. | | |
| 2002/0008166 | A1 * | 1/2002 | Fukaya | F02M 61/168 | 239/533.12 |
| 2005/0230365 | A1 * | 10/2005 | Lei | H01L 21/76898 | 219/121.71 |
| 2008/0000085 | A1 * | 1/2008 | Miyagawa | B23K 26/0613 | 29/890.1 |
| 2008/0034573 | A1 * | 2/2008 | Ohnuma | B21C 23/14 | 29/558 |
| 2008/0183325 | A1 * | 7/2008 | Kriegmair | G05B 19/402 | 700/159 |
| 2009/0053464 | A1 * | 2/2009 | Fahndrich | F01D 5/186 | 428/131 |

(Continued)

FOREIGN PATENT DOCUMENTS

WO WO-2014/174906 A1 * 10/2014

*Primary Examiner* — Geoffrey S Evans

(57) ABSTRACT

A process for manufacturing an injector body includes a) machining a metal blank to desired outer dimensions of the injector body; b) machining the metal blank along a first axis to define a spray hole within the metal blank; and c) machining the metal blank along a second axis to define an internal cavity in fluid communication with the spray hole.

15 Claims, 3 Drawing Sheets

(56) References Cited

U.S. PATENT DOCUMENTS

| | | | | |
|---|---|---|---|---|
| 2010/0276520 A1* | 11/2010 | Lewis | C21D 10/005 | 239/589 |
| 2011/0315793 A1* | 12/2011 | Michlik | B23P 9/00 | 239/533.3 |
| 2016/0031040 A1* | 2/2016 | Chang | B23K 26/364 | 219/121.68 |

* cited by examiner 100
106
d1
d2
d3
D
D1
D2
δ
102
104
108
110
112
114
116
117
118
120
400

PROCESS FOR MANUFACTURING AN INJECTOR BODY

TECHNICAL FIELD

The present disclosure relates to a method of manufacturing an injector body, and more particularly to a method of manufacturing an injector body with low time and cost.

BACKGROUND

Typically, an injector body used to inject fuel into a combustion chamber of an engine includes an internal cavity and a needle disposed within the internal cavity. Moreover, the injector body includes a sac portion defining one or more spray holes adjacent to the sac region. When manufacturing the injector body, manufacturers typically form the internal cavity prior to forming the spray holes of the injector body. Further, such processes are generally performed by carrying out Electric Discharge Machining (EDM) or laser drilling on the injector body.

In creating the spray holes after the creation of the internal cavity, added care may be needed in protecting internal walls of the injector body. One drawback that could possibly result when laser drilling the spray holes after the internal cavity is that laser energy could become incident on the internal walls of the injector body after removing material for the spray holes from the injector body. Therefore, the energy from the laser drilling process may inadvertently remove material from the internal walls of the injector body.

For reference, U.S. Pat. No. 6,070,813 (hereinafter referred to as "the '813 patent") discloses that in order to prevent the laser beam from passing through the tip portion of the injector body and impinging on the untargeted interior surface, a backing material is interposed between the interior surface and the untargeted interior surface. However, with use of backing materials such as that disclosed in the '813 patent, time, costs, and effort entailed in forming the injector body may be increased. Hence, there is a need for a simplified method that overcomes the aforementioned shortcomings typically encountered in manufacturing injector bodies.

SUMMARY

According to an aspect of the disclosure, a process for manufacturing an injector body includes a) machining a metal blank to desired outer dimensions of the injector body; b) machining the metal blank along a first axis to define a spray hole within the metal blank; and c) machining the metal blank along a second axis to define an internal cavity disposed in fluid communication with the spray hole.

According to another aspect of the disclosure, a process for forming laterally disposed holes that are in fluid communication with one another within a component includes machining the component in a first axis to define a blind first hole. In machining the component in the first axis, a depth of machining the component in the first axis is greater than a final depth of the first hole. The process further includes machining the component in a second axis to define a second hole in lateral relation to the first hole such that the blind first hole is opened and disposed in fluid communication with the second hole.

Other features and aspects of this disclosure will be apparent from the following description and the accompanying drawings.

DETAILED DESCRIPTION

Aspects of the disclosure will now be discussed in conjunction with the accompanying figures. The same reference numbers will be used throughout the figures to refer to same or like parts, unless specified otherwise. Also, it may be noted that any reference to elements in the singular is also to be construed to relate to the plural and vice-versa without limiting the scope of the disclosure to the exact number or type of such elements unless set forth explicitly in the appended claims. Accordingly, reference to various elements described herein is made either collectively or individually when there may be more than one element of the same type.

Figures 1, 2, 3, 4:
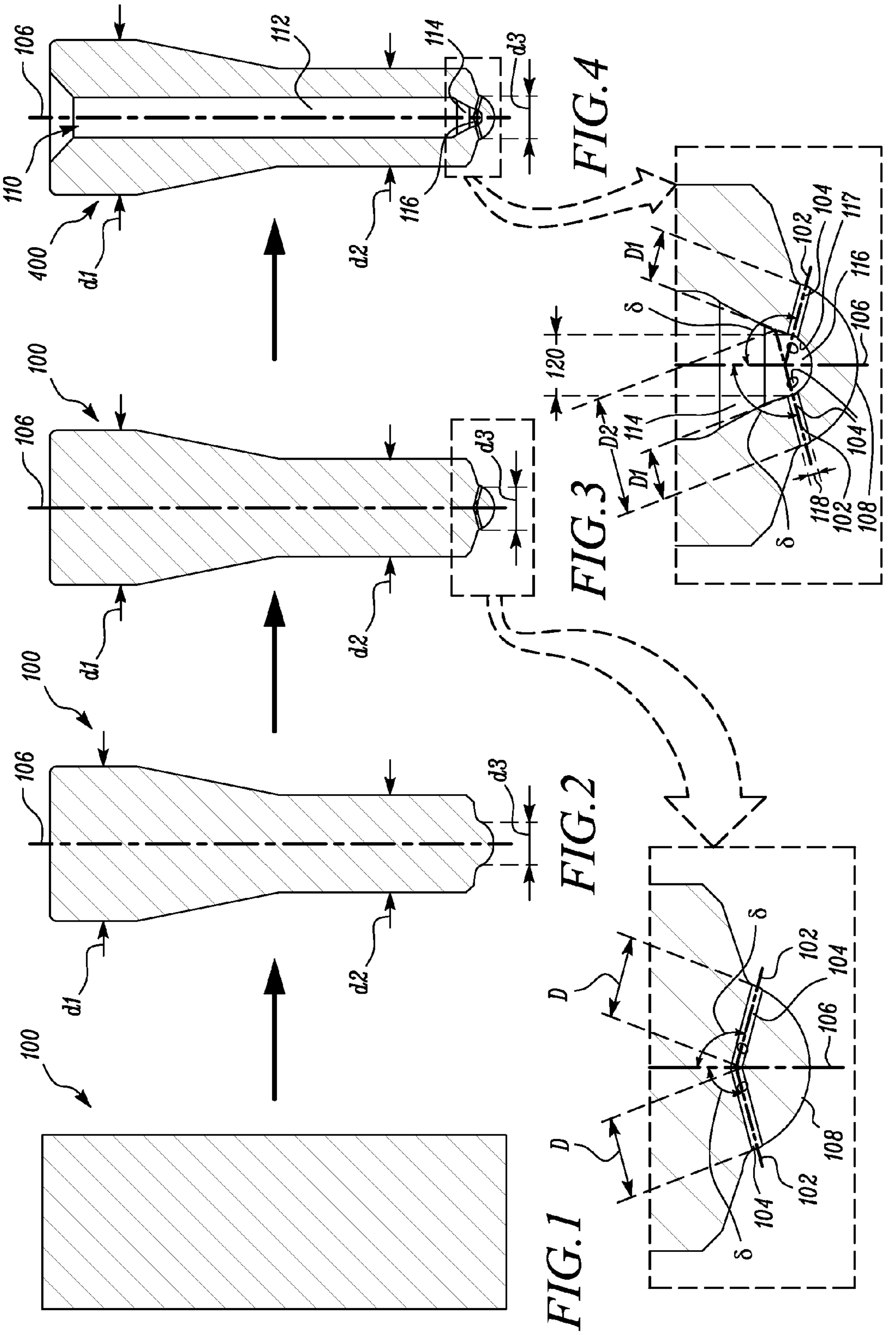
FIGS. 1-4 are front sectional diagrammatic representations showing a sequence of operations on a metal blank to manufacture an injector body according to an aspect of the disclosure.

FIGS. 1-4 illustrate front sectional diagrammatic representations of a sequence of operations on a metal blank 100 (shown in FIGS. 1-3) to manufacture an injector body 400 (as shown in FIG. 4) according to an aspect of the disclosure. The injector body 400 formed using embodiments of the present disclosure may be employed in various industrial applications, for example, an engine (not shown) such as, but not limited to, a compression ignition engine, a spark-ignition engine, a single-cylinder engine, a multi-cylinder engine, an engine having an inline configuration, a radial configuration or other configurations known to one skilled in the art.

Moreover, such engine may be used in various applications such as, but not limited to, transportation, for e.g., in off-highway trucks, in earth-moving machines; or for power generation, for e.g., when coupled to a generator set; or to drive turbo-machines and/or other equipment such as, for e.g., pumps, compressors and other devices known in the art.

Referring to FIGS. 1-4, the metal blank 100 as shown in FIG. 1 may be machined to desired outer dimensions of the injector body 400 (See FIG. 4). Referring to FIGS. 1-2, the metal blank 100 may be machined using operations commonly known to one skilled in the art, for e.g., turning. The injector body 400, as shown in FIG. 4, is an injector body 400 that is manufactured in accordance with embodiments of the present disclosure. The desired outer dimensions may be representative of one or more outer diameters d1, d2, and d3 of the injector body 400, as shown in FIGS. 2-4, so as to impart the injector body 400 with a stepped outer profile. However, the desired outer dimensions disclosed herein are not limited to defining the exact outer profile of the injector body 400 shown in FIGS. 2-4; rather the desired outer dimensions for a given injector body may vary from one application to another depending on specific requirements of the associated application.

Referring to FIGS. 2-3, the metal blank 100 is further processed by machining along a first axis 102 of the metal blank 100 to define a spray hole 104 within the metal blank 100. Two spray holes 104 are shown in the front sectional view of FIG. 3 and three spray holes 104 are visible in the illustrated embodiment of FIG. 4. Although two or three spray holes 104 as shown in the illustrated embodiments of FIGS. 3 and 4 are disclosed herein, the metal blank 100 may be machined to define any number of spray holes 104 depending on specific requirements of an application. Moreover, as illustrated in FIG. 4, the spray holes 104 are arranged in a circumferential array about a second axis 106 of the metal blank 100. However, it should be noted that other configurations or arrangements of spray holes 104 on the injector body 400 may optionally be contemplated depending on specific requirements of an application.

For the purposes of the present disclosure, each of the axes 102 associated with the spray holes 104 can be regarded as the first axis 102. Moreover, in forming the spray holes 104, the metal blank 100 may be machined by performing Electric Discharge Machining (EDM) or laser drilling at a bottom wall 108 of the metal blank 100. This way, the spray holes 104 may be located in the bottom wall 108 of the injector body 400. Moreover, a depth D of machining the spray holes 104, as shown in FIG. 3, may be maintained greater than a final depth D1 of the spray holes 104 (See FIG. 4). However, the depth D of machining the spray holes 104 (See FIG. 3) is also kept lesser than a distance D2 that is present between the bottom wall 108 and an internal surface 117 located at a sac region 116 of the injector body 400 (See FIG. 4).

Referring to FIGS. 3-4, the metal blank 100 is further processed by machining along the second axis 106 to define an internal cavity 110 that is disposed in fluid communication with the spray hole 104. In various embodiments of the present disclosure and as shown in the accompanying drawings, the second axis 106 can be regarded as the longitudinal axis of the injector body 400. As disclosed earlier herein, it may be beneficially contemplated to pre-determine and maintain the depth D of machining the spray holes 104 (See FIG. 3) greater than a final depth D1 of the spray holes 104 (See FIG. 4) i.e., before performing a machining of the metal blank 100 to form the internal cavity 110. However, the depth D of machining the spray holes 104 (See FIG. 3) is also kept lesser than a distance D2 that is present between the bottom wall 108 and an internal surface 117 located at a sac region 116 of the injector body 400 (See FIG. 4). This way, upon forming the internal cavity 110 within the metal blank 100, the spray hole 104 may open up and be disposed in fluid communication with the internal cavity 110, in this case, the sac region 116 of the internal cavity 110 as shown in FIG. 4.

Optionally or additionally, before forming the spray holes 104 in the metal blank 100, the metal blank 100 or at least the sac region 116 of the metal blank 100 may be subject to various heat treatment processes commonly known to one skilled in the art. These heat treatment processes may include, for example, annealing, quenching, and the like, but are not limited thereto. The heat treatment processes may help improve strength of the metal blank 100 or at least material that is located at the sac region 116 of the metal blank 100.

Moreover, in the illustrated embodiment of FIGS. 2-4, each of the first axes 102 associated with the spray holes 104 may subtend an angle δ of about 90 degrees to 180 degrees with the second axis 106 i.e., the longitudinal axis of the injector body 400. For example, in one application, the angle δ may be kept at 120 degrees, as shown in FIGS. 2-4. In another application, the angle δ may be kept at, for example, 145 degrees. In yet another application, the angle δ may be kept at, for example, 175 degrees. Further, it may also be noted that when multiple spray holes 104 are formed in an injector body 400, the first axes 102 associated with each of the spray holes 104 need not necessarily subtend the same angle δ with the second axis 106 of the injector body 400. The first axes 102 associated with each of the spray holes 104 can be configured to subtend similar or dissimilar angles with the second axis of the injector body 400 thereby rendering a symmetrical or asymmetrical configuration to the array of spray holes 104 on the bottom wall 108 of the injector body 400. Therefore, it will be appreciated by persons having skill in the art that the angle δ, disclosed herein, may vary for each of the spray holes 104 depending on specific requirements of an application such as, but not limited to, pressure required in the injected fuel, fuel-spray pattern required in a combustion chamber of an engine, location of a piston at the time of fuel injection, and the like.

With continued reference to FIGS. 3-4, the internal cavity 110 formed from machining the metal blank 100 along the second axis 106 may include an internal bore 112 that is distally located from each of the spray holes 104. The internal bore 112 may be configured to receive a needle (not shown) therein. The internal cavity 110 may further include a fuel gallery 114 that is located below the internal bore 112. The fuel gallery 114 may be configured to receive a supply of fuel and/or air from an inlet port (not shown) of the injector body 400.

As such, a type and/or nature of fuel may vary depending on a type of fuel injection system associated with the injector body 400. The types of fuel that can be supplied using the injector of the present disclosure, may include, but is not limited to, distillate diesel, biodiesel, gasoline, natural gas, ethyl alcohol, dimethyl ether, or combinations thereof. One of ordinary skill in the art will appreciate that the fuel type may vary depending upon a type of the engine used and/or other specific requirements of an application.

The internal cavity 110 may further include the sac region 116 that is configured to extend between the fuel gallery 114 and each of the spray holes 104. As shown, a diameter 118 of the spray holes 104 is less than a diameter 120 of the sac region 116. However, in an alternate embodiment, the diameter 118 of the spray holes 104 could be equal to the diameter 120 of the sac region 116. The sac region 116 may be configured to maintain a pre-determined volume of fuel and/or air for compression by the needle and subsequent supply to a combustion chamber (not shown) through the spray holes 104.

Various additional components and features associated with the injector body 400 have been omitted in the illustrations for the sake of simplicity and aiding clarity in understanding of the present disclosure. Therefore, such omission of the additional components and/or features must not be construed as being limiting of this present disclosure, rather the injector body 400 may be implemented with such additional components and/or features depending on specific requirements of an application.

Figure 5:
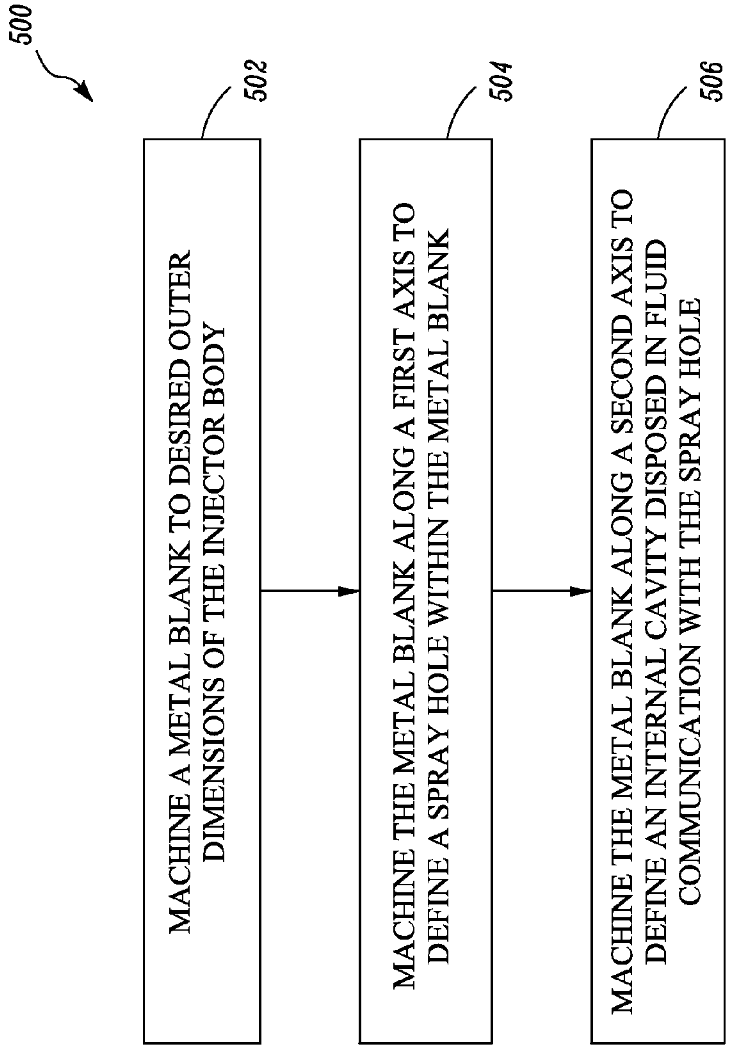
FIG. 5 is a flowchart of a method for manufacturing the injector body according to an aspect of the disclosure.

Referring to FIG. 5, a method 500 for manufacturing the injector body 400 is disclosed. At step 502, the method 500 includes machining a metal blank 100 to desired outer dimensions of the injector body 400. At step 504, the method 500 further includes machining the metal blank 100 along the first axis 102 to define the spray hole 104 within the metal blank 100. At step 506, the method 500 further includes machining the metal blank 100 along the second axis 106 to define the internal cavity 110 in fluid communication with the spray hole 104. In various embodiments of the present disclosure, it may be noted that with regards to the method 500, the metal blank 100 should be machined for the spray holes 104 before proceeding to be machined for the internal cavity 110 i.e., step 504 should be performed before step 506. This way, the walls of the injector body 400 adjoining the internal cavity 110 may be protected from being exposed to the energy associated with the Electric Discharge Machining (EDM) process or the laser drilling process.

Figure 6:
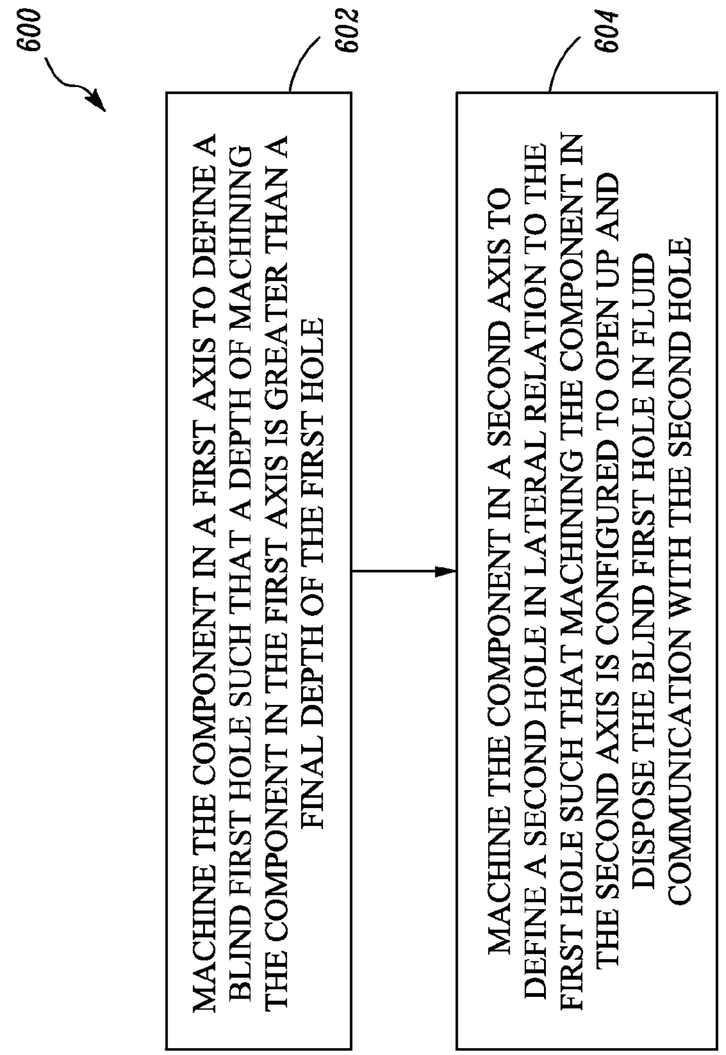
FIG. 6 is a flowchart of a method for forming holes in a machine component, according to an aspect of the disclosure.

FIG. 6 is a flowchart of a method 600 for forming holes in a machine component. The machine component disclosed herein may be, for e.g., the injector body 400 of the present disclosure. Although the present disclosure has been explained in conjunction with the injector body 400, one of ordinary skill in the art will appreciate that embodiments of the present disclosure can be suitably implemented in forming holes in other types of machine components commonly encountered in various types of industrial applications. Moreover, it will be further appreciated that embodiments of the present disclosure can be implemented in forming holes that are laterally disposed to one another and in fluid communication with one another within a given machine component.

Referring to FIG. 6, at step 602, the method 600 includes machining the component in a first axis (See first axis 102 from FIG. 2) to define a blind first hole (See spray hole 104 from FIG. 3). In machining the first hole, a depth of machining the component in the first axis is beneficially kept greater than a final depth of the first hole. For example, refer to 'D' from FIG. 3 and 'D1' from FIG. 4, wherein D>D1.

At step 604, the method 600 further includes machining the component in a second axis (See second axis 106 from FIG. 4) to define a second hole (See internal cavity 110 from FIG. 4) in lateral relation to the first hole, wherein machining the component in the second axis is configured to open up and dispose the blind first hole in fluid communication with the second hole (See spray hole 104 and internal cavity 110 from FIG. 4).

Various aspects disclosed herein are to be taken in the illustrative and explanatory sense, and should in no way be construed as limiting of the present disclosure. It should be noted that individual features shown or described for one aspect may be combined with individual features shown or described for another aspect. Also, some features are shown or described in the functional context to illustrate the use of the present disclosure, however it is to be understood that such features may be omitted within the scope of the present disclosure without departing from the spirit of the present disclosure and as defined in the appended claims.

Additionally, all numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

Moreover, joinder references (e.g., connected, attached, affixed, coupled and the like) are only used for identification purposes to aid the reader's understanding of the present disclosure, and may not create limitations, particularly as to the position, orientation, or use of the components and/or methods disclosed herein. Therefore, such joinder references are to be construed broadly. Moreover, such joinder references do not necessarily infer that two elements are directly connected to each other.

INDUSTRIAL APPLICABILITY

Aspects of the present disclosure have applicability for implementation and use in forming spray holes in an injector body. "Back-wall" protection techniques typically employed in previously known processes for manufacturing injector bodies included positioning a suitably thick block of tungsten, tungsten carbide, ceramics, or other high temperature material between the spray hole and the walls adjoining the internal cavity of the injector body. However, with use of the method 500 disclosed herein, manufacturers may produce injector bodies without employing the "back-wall" protection technique to the internal walls of the injector body when creating spray holes. Therefore, manufacturers may be able to offset effort, time, and costs incurred with previously known manufacturing techniques when producing injector bodies with implementation of the method 500 disclosed herein.

While aspects of the present disclosure have been particularly shown and described with reference to the aspects above, it will be understood by those skilled in the art that various additional aspects may be contemplated by the modification of the disclosed machine, systems and methods without departing from the spirit and scope of what is disclosed. Such aspects should be understood to fall within the scope of the present disclosure as determined based upon the claims and any equivalents thereof.

I claim:

1. A process for manufacturing an injector body, the process comprising:

machining a metal blank to desired outer dimensions of the injector body;

machining the metal blank along a first axis to define a spray hole within the metal blank, after machining the metal blank to the desired outer dimensions of the injector body; and machining the metal blank along a second axis to define an internal cavity in fluid communication with the spray hole, after machining the metal blank along the first axis.

2. The process of claim 1, wherein a depth of machining the metal blank along the first axis is greater than a final depth of the spray hole.

3. The process of claim 1, wherein machining a metal blank to desired outer dimensions of the injector body further includes machining a bottom wall of the metal blank so as to locate the spray hole in the bottom wall of the metal blank.

4. The process of claim 1, wherein the first axis and the second axis subtend an angle of about 90 degrees to 180 degrees therebetween.

5. The process of claim 1, wherein the second axis is a longitudinal axis of the injector body.

6. The process of claim 1, wherein the internal cavity is configured to include:

an internal bore distally located from the spray hole and configured to receive a needle therein;

a fuel gallery located below the internal bore; and a sac region extending between the fuel gallery and the spray hole.

7. The process of claim 6 further including predetermining a depth of machining the spray hole before machining the metal blank along the first axis so that the spray hole is configured to open up and be disposed in fluid communication with the sac region obtained from machining the metal blank along the second axis.

8. The process of claim 7, wherein a diameter of the spray hole is less than or equal to a diameter of the sac region.

9. The process of claim 1, wherein machining the metal blank along the first axis includes performing at least one of Electric Discharge Machining (EDM) and laser drilling.

10. The process of claim 1, wherein machining the metal blank to desired outer dimensions includes performing rough machining and finishing on the metal blank to the desired outer dimensions of the injector body.

11. The process of claim 1, wherein machining the metal blank along the second axis includes performing rough machining and finishing at least a portion of the metal blank to define the internal cavity of the injector body.

12. A process for forming laterally disposed holes that are in fluid communication with one another within a component, the process including:

machining the component in a first axis to define a blind first hole, wherein a depth of machining the component in the first axis is greater than a final depth of the first hole; and machining the component in a second axis, after machining the component in the first axis, to define a second hole in lateral relation to the first hole, wherein machining the component in the second axis is configured to open up and dispose the blind first hole in fluid communication with the second hole.

13. The process of claim 12, wherein a diameter of the first hole is lesser than a diameter of the second hole.

14. The process of claim 12, wherein the first axis and the second axis subtend an angle of about 90 degrees to 180 degrees therebetween.

15. The process of claim 12, wherein machining the component in the second axis includes performing at least one of Electric Discharge Machining (EDM) and laser drilling.

* * * * *